United States Patent [19]

de Boer et al.

[11] 4,056,832
[45] Nov. 1, 1977

[54] SERVO SYSTEM FOR CONTROLLING THE POSITION OF A READING HEAD

[75] Inventors: Jacob de Boer; Anthonie Walraven, both of Eindhoven, Netherlands

[73] Assignee: U.S. Philips Corporation, New York, N.Y.

[21] Appl. No.: 774,523

[22] Filed: Mar. 4, 1977

Related U.S. Application Data

[63] Continuation of Ser. No. 590,138, June 25, 1975, abandoned.

[30] Foreign Application Priority Data

July 15, 1974 Netherlands .......................... 7409513
Jan. 14, 1975 Netherlands .......................... 7500395

[51] Int. Cl.² ...................... G11B 21/04; G11B 21/10
[52] U.S. Cl. ......................................... 360/77; 360/70
[58] Field of Search ..................................... 360/77, 70

Primary Examiner—Robert S. Tupper
Attorney, Agent, or Firm—Frank R. Trifari; Simon L. Cohen

[57] ABSTRACT

A servo system for controlling the position of a magnetic reading head relative to the center of a selected information track. During recording a long-wave positioning signal is recorded below the data signal in the tracks. Upon reading out, the head not only reads the information of the selected track but, as result of crosstalk, also the positioning signals of the adjacent tracks. After filtering out and processing the positioning signals, a control signal for controlling the head is obtained.

12 Claims, 10 Drawing Figures

SERVO SYSTEM FOR CONTROLLING THE POSITION OF A READING HEAD

This is a continuation of application Ser. No. 590,138, filed June 25, 1975, now abandoned.

This invention relates to a servo system for controlling the position of a magentic reading head relative to the center of a selected track on a magnetizable recording medium which is relatively movable with respect to the head and has a plurality of juxtaposed tracks, said system comprising a reading head for reading information on a selected track which is suitable for simultaneously detecting information on tracks present on either side thereof so that a composite signal is obtained, a circuit which is connected to the output of the reading head and serves to separate the composite signal and to generate a servo signal which is a function of the deviation of the reading head from the center of the selected track, and head positioning means controlled by the servo signal.

In magnetic devices in which information is recorded in and read out from tracks on a magnetizable recording medium by means of magnetic heads, it is of great importance that during reading out the reading head be positioned accurately above the selected track. The degree of accuracy with which the reading head can be positioned determined the distance necessary between adjacent tracks and hence influences to a considerable extent the storage efficiency, that is the number of information units which can be stored per unit of surface area of the recording medium. For increasing the track accuracy, several servo systems for controlling the position of reading heads have been proposed, both servo systems for centering a head to the track in a video recorder, and servo systems for positioning the head in a magnetic disc memory.

A device of the kind mentioned in the preamble and which is destined in particular for positioning the head in a magnetic disc memory is known from the U.S. Pat. No. 3,491,347. The device known from this patent specification has as a particularity that the buffer zones between the tracks have been eliminated so that a larger information density is obtained. Upon reading a selected track, the signals of the adjacent tracks crosstalk as a result of the absence of the buffer zones. By means of a device for filtering and logically handling the overall read signal, a centering signal is obtained which corresponds in value and sign with the difference in amplitude of the adjacent tracks. In order to be able to perform this, the tracks present beside a selected track should have distinguishable characteristics, which is realized in the known device by modulating the data signals of every three successive tracks on three different carrier waves. The carrier waves may differ either in frequency or in phase. A drawback hereof is that for providing distinguishable characteristics, the carrier wave frequencies should differ by at least a factor 1½, so that a limit is imposed upon the shortest frequency which can still be written (and hence on the information density). When using carrier waves of different phases, the distinction of the signal of a selected track from that of the adjacent tracks is rather difficult. This involves not only that it is difficult to generate a centering signal, but also that it is difficult to prevent crosstalk of the data signals. A further difficulty is that, when comparatively short-wave signals are used - as is described in the said patent — the crosstalk on which the whole system is based, is small, while, owing to the absence of buffer zones, there will be 100% crosstalk of the signal of one of the adjacent racks as soon as the head is positioned with a substantial part of its width over the adjacent track in question.

It is the object of the present invention to provide a servo system which does not exhibit the drawbacks associated with the above-mentioned systems. For that purpose, the servo system according to the invention is characterized in that a device is present to write long-wave positioning signals on the tracks and that the reading head is suitable to simultaneously read the information content of a selected track and the long-wave positioning signals on the tracks present on either side thereof.

The system according to the invention is based on the recognition of the fact that upon reading out a given track the condition is used that the low frequency (long-wave) positioning signals of the adjacent tracks crosstalk to the reading head and are hence also read out, while the high frequency (short-wave) information signals of the adjacent tracks do not cross-talk and are hence not read out. For a good operation of the system it is of importance that the wave-length of the positioning signals be at least of the same magnitude as the distance between the tracks.

Within the scope of the invention there are several possibilities for the positioning signal form.

A first preferred embodiment of the system according to the invention is characterized in that a device is present to write on the tracks alternately a positioning signal of a first and a second wavelength and having such a phase that the tracks present beside a selected track always comprise positioning signals of the same wavelength but in opposite phases, the circuit connected to the output of the reading head comprising at least two frequency-selective filters for separating the two individual positioning signals from the composite signal and a device for deriving a servo signal from the individual positioning signals.

The above-described measuring system has the advantage that it comprises a zero method. However, there are certain circumstances in which it does not prove readily possible to record the servo signals of the adjacent tracks sufficiently accurately in opposite phases on the recording medium. In those cases an amplitude measuring system may advantageously be used.

For that purpose, a further preferred embodiment of the system according to the invention is characterized in that a device is present to write on at least every three successive tracks positioning signals of a first, a second and a third wavelength, respectively, the circuit connected to the output of the reading head comprising a corresponding number of frequency-selective filters for separating the positioning signals from the selected track and from the adjacent tracks, as well as a corresponding number of electronic circuits from which a servo signal is obtained by mutual comparison of the amplitudes of the three positioning signals.

The system according to the invention is particularly suitable for use in video recorders, since an "alien" signal, in this case a positioning signal, can easily be written "under" the video signal. In addition, the frequency of the positioning signals can simply be derived from the line frequency of the video signal.

Although in the above-described measuring systems measurements are performed on every track so as to obtain servo information, this is not necessary in all cases. It has been found, for example, that it is sufficient for a reasonably fast servo circuit that measurements are performed every other track to obtain servo information.

Therefore, a second preferred embodiment of the system according to the invention is characterized in that a device is present to write in the tracks a positioning signal every other track.

An advantage hereof is that simpler circuits than in the first-mentioned case will suffice.

In this case also there are several possibilities for the positioning signals.

A further preferred embodiment of the system according to the invention is characterized in that a device is present to write in every other information track positioning signals having a fixed wavelength but in mutually opposite phases, the circuit connected to the output of the reading head comprising a frequency-selective filter for separating the positioning signals from the composite signal and a device for deriving a servo signal from the positioning signals.

The above measuring system as well as one of the other above measuring systems has the advantage that it comprises a zero method. However, there are certain circumstances in which it proves not to be readily possible to record positioning signals every other track sufficiently accurately in opposite phases on the recording medium.

Therefore, yet another preferred embodiment of the system according to the invention is characterized in that a device is present to write in every other information track positioning signals of a first and a second wavelength, respectively, the circuit connected to the output of the reading head comprising two frequency-selective filters for separating the positioning signals of the tracks present beside a selected track from the composite signal, as well as an electronic circuit from which a servo signal is obtained by mutual comparison of the amplitudes of the positioning signals.

The invention will be described in greater detail with reference to the drawing.

FIG. 4 is a block diagram of a writing circuit which may be used within the scope of the invention with the recorder shown in FIG. 1a.

FIG. 6 is a block diagram of another writing circuit which may be used with the recorder shown in FIG. 1a.

FIG. 8 is a block diagram of yet another writing circuit which may be used with the recorder shown in FIG. 1a.

Figure 1A:
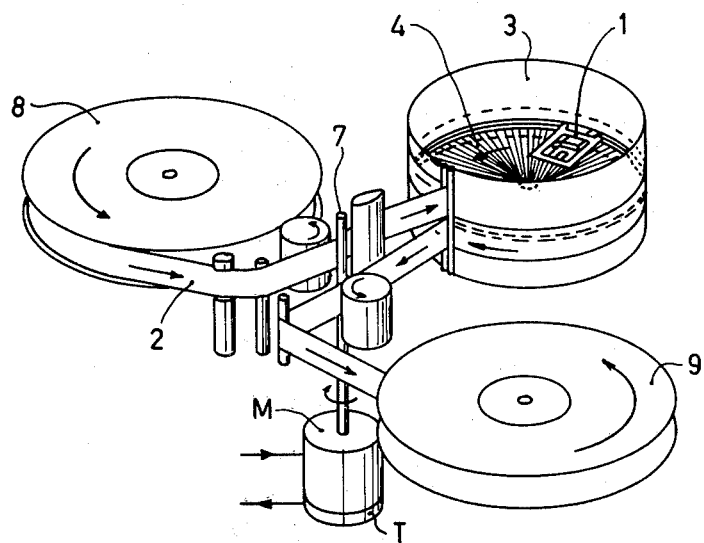
FIG. 1a shows diagrammatically a magnetic head and the tape guide with the tape guide means and driving means in a helical scan video recorder.

FIG. 1a shows a video drum 3 in which a head disc 4 is present. A video head 1 is mounted on it. The magnetic tape 2 is unwound from the reel 8, laid in a loop about the drum 3, and wound on the reel 9. Such a tape guide is used in helical scan video recorders. However, the invention is not restricted to the use in (helical scan) video recorders but can very readily be explained with reference to the problems occurring in video recorders in general. With each (half) revolution of the head disk 3 the video head 1 writes a track with a length of-in a certain case — 47 cm and a width of 150 to 250 microns. This comparatively large length/width ratio of the tracks give rise to positioning errors during scanning the tape 2 by the head 1 as a result of which annoying interferences in the displayed picture occur in that the adjacent track is also read partly. For correcting the position of the head 1 relative to a track written on the magnetic tape 2, it is within the scope of the invention to control the speed of the magnetic tape 2 which is driven by the capstan 7 and unwound from the reel 8 and wound on the reel 9.

Figure 1B:
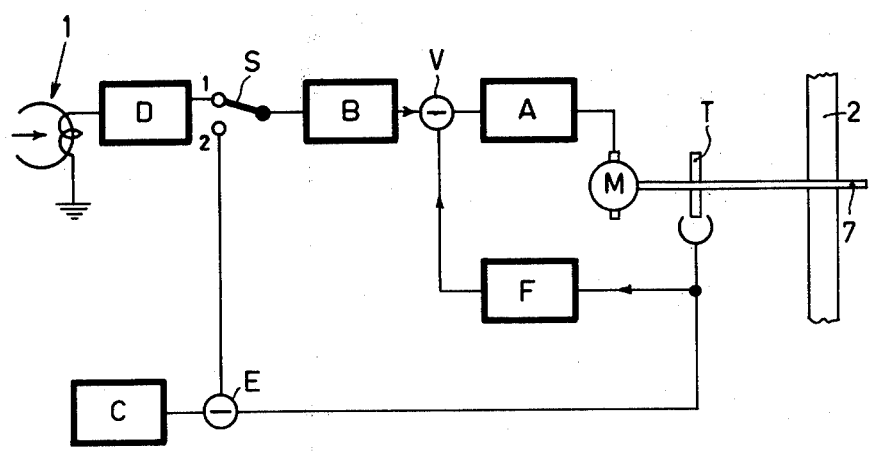
FIG. 1b shows a block diagram of a servo system for controlling the position of the head of FIG. 1a relative to its track.

For this purpose serves the servo circuit shown diagrammatically in FIG. 1b in which the same reference numerals are used for corresponding components as in FIG. 1a. The track detection circuit D connected to the magnetic head 1 makes a servo signal upon reading, which signal is used to control the reference source B. The switch S then is in the position 1 (= reading). The signal of the reference source B is compared by the comparison circuit V with the velocity-proportional signal of the tachometer T obtained via the frequency detector F. The output signal of V controls the servo amplifier A which ultimately controls the speed of the motor M which drives the tape 2 via the capstan 7. During writing, the switch S is in the position 2 (= writing). The tape speed is then maintained constant by means of the signal of the reference source C which is compared with the tacho signal in the phase discriminator E.

Figure 2:
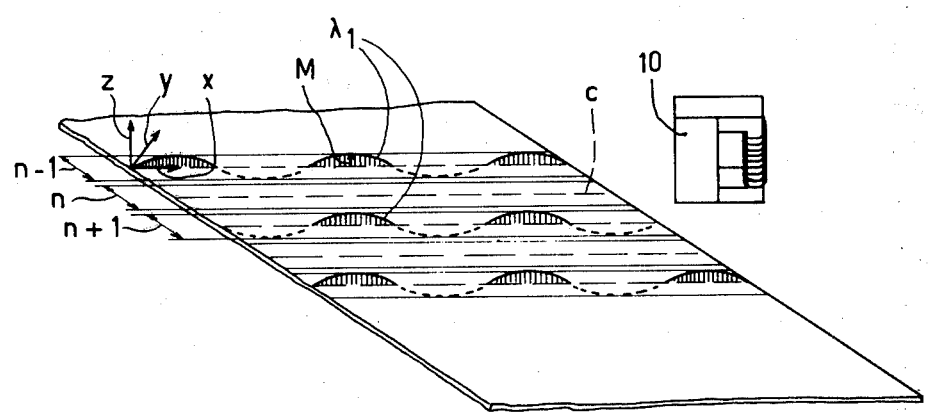
FIGS. 2 and 3 show various guide signal forms which can be used for generating a servo signal.
Figure 3:
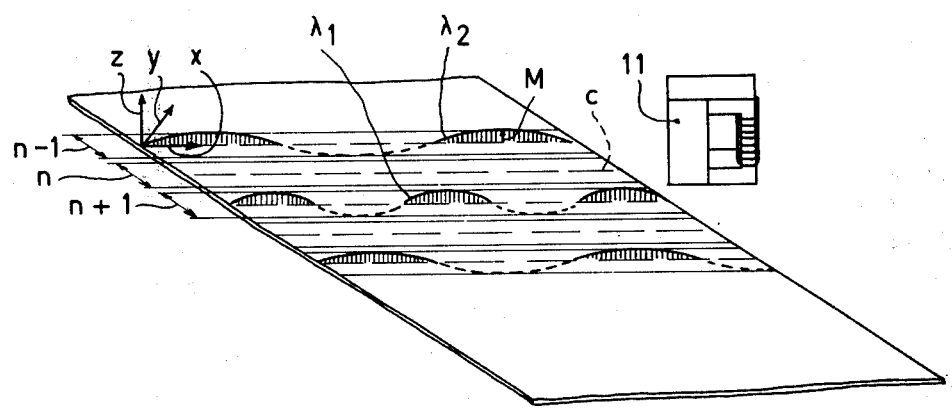

In order to obtain a servo system for automatically keeping the head 1 centered on the track, said system should comprise a measuring system which can provide a positioning signal which is a measure of the deviation from the center of the track and which indicates the direction in which the position should be readjusted. For that purpose, according to the invention, long-wave positioning information is recorded in the information tracks themselves, as is shown in FIGS. 2 and 3. The head should be capable of also reading the long-wave positioning information of the tracks present beside the track to be followed.

FIG. 2 shows diagrammatically the situation in which the two adjacent tracks $n-1$ and $n+1$ of the information track $n$ to be followed comprise positioning signals of equal wavelength $\lambda_1$ but in opposite phases and with an essentially longer wavelength than the information signals. The length direction of the tracks is parallel to the X axis of the system of axes shown. The variation of the magnetization M in the tracks represents the positioning information. For a reasonably fast servo circuit it is sufficient that every other track is measured to obtain servo information.

Synchronous detection of the sum of the positioning signals of the adjacent tracks read by the head 10, to be distinguished from the information track of the track $n$ to be followed by means of a frequency-selective filter, then provides a control voltage which indicates both the direction and the value of the deviation of the head 10 relative to the line $c$ centrally between the adjacent tracks $n-1$ and $n+1$.

FIG. 3 shows diagrammatically the situation in which both adjacent tracks $n-1$ and $n+1$ of the track $n$ to be followed comprise positioning signals of different wavelengths $\lambda_1$ and $\lambda_2$. In this case also the starting point is that it is sufficient for a reasonably fast servo circuit to perform the measurement every other track to obtain servo information. After frequency-selective filtering of the positioning signals read by the head 11 and amplitude detection, the required control voltage is obtained from the difference of the detected adjacent signals.

Figure 4:
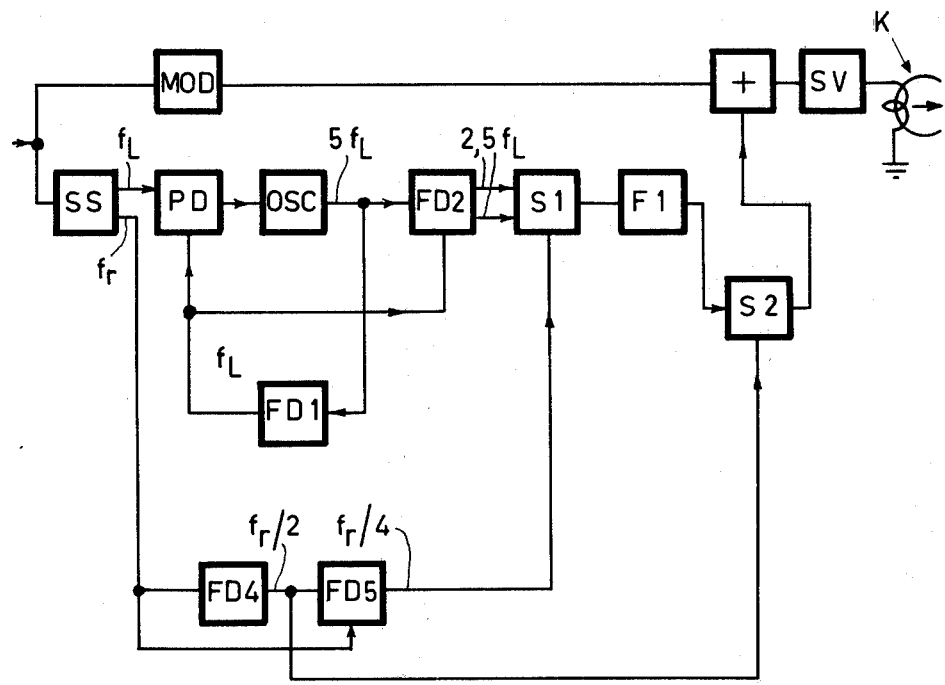

FIG. 4 shows a block diagram for the writing part of a measuring system which is suitable to write the configuration of positioning signals shown in FIG. 2 on a recording medium. In this case the measuring system forms part of a helical scan video recorder. The frequency of the positioning signal to be written is coupled to the line frequency of the video signal so as to minimize mutual cross-talk. In the present case the selected frequency is 2.5 times the line frequency and is obtained as follows. The sync. separator SS separates the line synchronization signal of frequency $f_L$ and the frame synchronization signal of frequency $f_r$ from the complete video signal to be recorded. The frequency-controllable oscillator OSC generates a signal the frequency of which is made exactly equal to 5 times the line frequency $f_L$ by means of a frequency divider FD1 and a phase discriminator PD. The positioning frequency 2.5 $f_L$ is obtained by means of the frequency divider FD2 connected to the output of the oscillator OSC. Since the track pattern on the tape has already been chosen to be so that on either side of a line on the tape always either even or odd lines are present, the polarity of the signal should be reversed every two frames so as to ensure that the adjacent tracks have opposite polarities. This is done as follows. From the frame synchronization signal $f_r$ switching signals are obtained by means of two-dividers FD4 and FD5 for controlling the electronic switches S1 and S2 which reverse the polarity of the positioning signal in the correct sequence and supply said signal to the head every other track. By means of the filter F1 a sinusoidal signal is made out of the block-shaped positioning signal which appears at the output of the switch S1. This signal is supplied to the input of the write amplifier SV together with the complete video signal modulated by the frequency modulator MOD. The output of the write amplifier SV is connected to the electric winding of the writing/reading head K.

Figure 5:
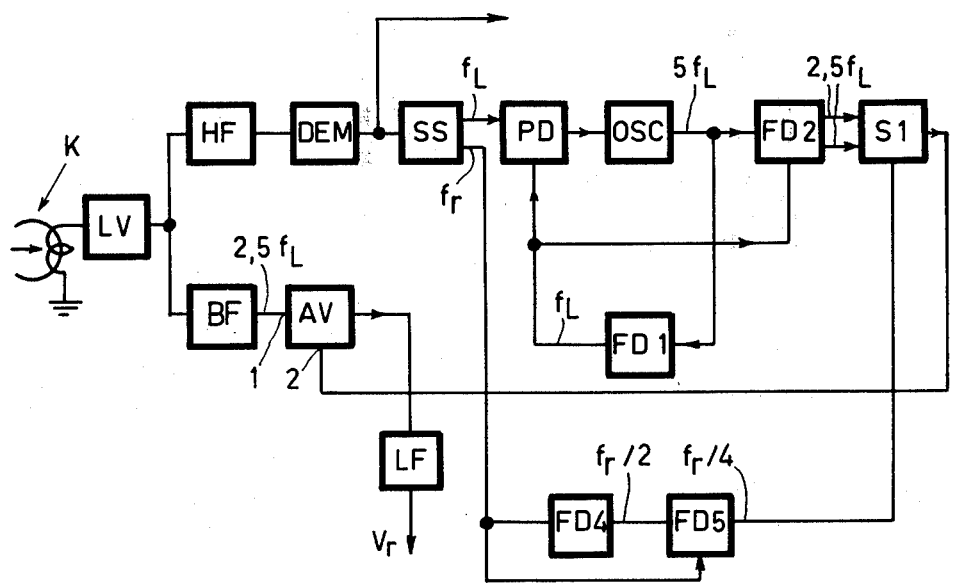
FIG. 5 is a block diagram of a circuit associated with the circuit shown in FIG. 4 with which the control voltage for controlling the head position is derived.

FIG. 5 shows a block diagram for the associated reading part. A read amplifier LV amplifies the composite signal which originates from the writing/reading head K. The positioning signal of frequency 2.5 $f_L$ is separated from the composite signal by means of band pass filter BF. The output of the filter is connected to an input 1 of an analog multiplier AV. The other input 2 of the analog multiplier is connected to the output of the switch S1. The signal present at the output of the switch S1 is derived from the reproduced video signal by means of a circuit which is identical to that sub-circuit shown in FIG. 4 with which the signal present at the switch S1 is derived from the video signal to be recorded.

After analog multiplication of the signals of the bandpass filter BF and the switch S1 by means of the analog multiplier AV, the signal passes through a lowpass filter LF and a direct voltage signal $V_r$ remains which is proportional to the deviation of the head K relative to the centre of the selected track. This direct voltage signal may be used to control an arm on which the head is mounted but is preferably used to control the speed of the motor which moves the tape and hence to keep the head centrally on the selected track as is shown in FIGS. 1a and 1b.

Figure 6:
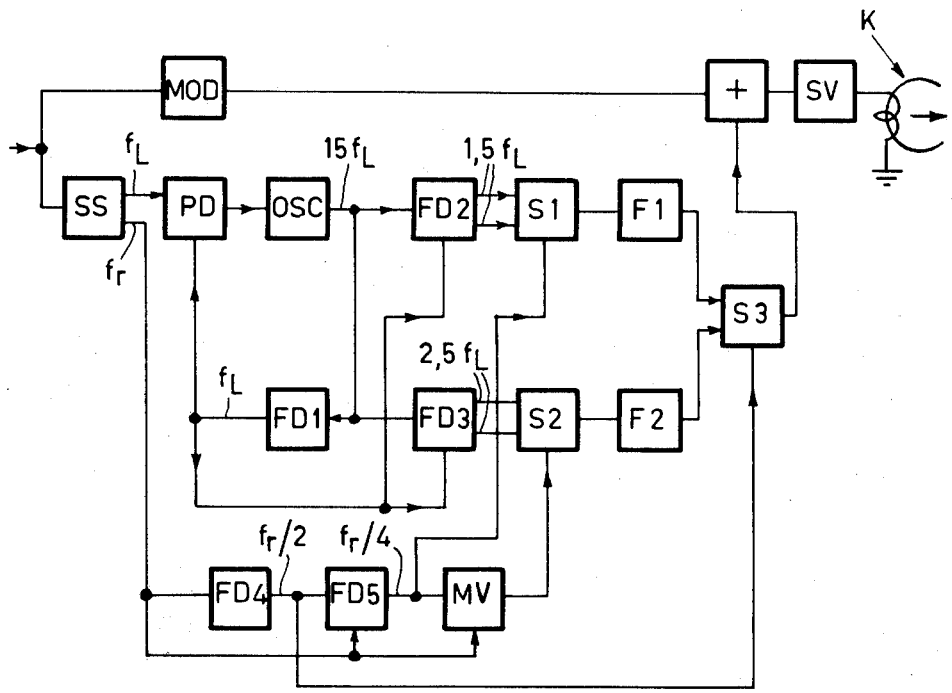

FIG. 6 shows a block diagram for the writing part of a measuring system which is suitable to write positioning signals in every information track of a recording medium. In this case also the measuring system forms part of a helical scan (or transversal scan) video recorder. The frequencies of the two positioning signals to be written-in are coupled to the line frequency of the video signal so as to minimize mutual cross-talk. The frequencies chosen in the present case are 1.5 times and 2.5 times the line frequency and are obtained as follows. The synchronous separator SS separates the line synchronisation signal of frequency $f_L$ and the frame synchronisation signal of frequency $f_r$ from the complete video signal to be recorded. The frequency-controllable oscillator OSC generates a signal, whose frequency is made exactly equal to 15 times the line frequency $f_L$ by means of a frequency divider FD1 and a phase discriminator PD. The two positioning frequencies 1.5 $f_L$ and 2.5 $f_L$ are obtained by means of the frequency dividers FD 2 and FD 3 connected to the output of the oscillator OSC. Since the track pattern on the tape has already been chosen to be so that on either side of a line on the tape always either even or odd lines are present and the selected positioning signals then have the same phase, the polarity of both positioning signals should also be reversed every two frames so as to ensure that the adjacent tracks have opposite polarities. This is carried out as follows. From the frame synchronisation signal $f_r$ switching signals are obtained by means of two-dividers FD 4 and FD 5 and a synchronous delay multivibrator MV, which signals serve to control the electronic switches $S_1$, $S_2$ and $S_3$ which reverse and select the polarity of the guide signals in the correct sequence. By means of the filters $F_1$ and $F_2$ sinusoidal signals are made out of the block-shaped positioning signals which appear at the outputs of the switches $S_1$ and $S_2$. These are applied to the input of the write amplifier SV together with the complete video signal modulated by the frequency modulator MOD. The output of the write amplifier V is connected to the electric winding of the read-write head K.

Figure 7:
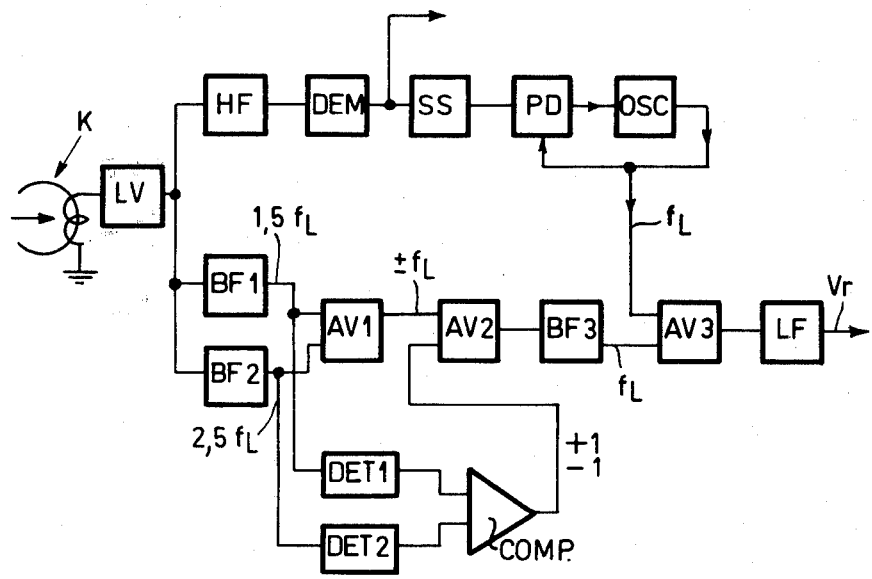
FIG. 7 is a block diagram of a circuit associated with the circuit of FIG. 6 with which the control voltage for controlling the head position is derived.

FIG. 7 shows a block diagram for the associated reading circuit. A reading amplifier LV amplifies the composite signal which is received from the writing/reading head K. The two positioning signals of frequency 1.5 $f_L$ and 2.5 $f_L$, respectively, are separated from the signal by means of bandpass filters BF 1 and BF 2. The outputs of the two filters are connected to an analog multiplier AV 1. This is proportioned so that each output operates as a limiter for larger signals so that the output voltage is proportional to the smaller of the two (= sum of adjacent signals) while the output frequency is equal to the line frequency $f_L$ so that this signal can be detected synchronously by means of the line frequency $f_L$ transmitted by the video signal. For that purpose, the output of the read amplifier LV is coupled, via a highpass filter HF, an fm demodulator DEM, a sync. separator SS and a phase discriminator PD, to an oscillator OSC which generates a signal of frequency $f_L$. Since the polarity of the resulting control signal would vary per track, its polarity should previously be reversed. For that purpose, the amplitudes of the two positioning signals are compared by means of detectors DET 1 and DET 2 and a comparator COMP, and the output signal of the comparator is multiplied analogously with the output signal of the analog multiplier AV 1 by means of the analog multiplier AV 2. By means of the bandpass filter BF 3 it is ensured that only the part having frequency $f_L$ of the output signal of the analog multiplier AV 2 is passed. After analog multiplication of the output signals of the bandpass filter BF 3 and the oscillator OSC by means of the analog multiplier AV 3, the signal passes through a lowpass filter LF and a direct voltage signal $V_r$ remains which is proportional to the deviation of the head K relative to the centre of the selected track. Said direct voltage signal may be used to control an arm on which the head is mounted, but it is also possible to use it to control the speed of the motor which moves the tape and hence to keep the head centrally on the selected track.

Figure 8:
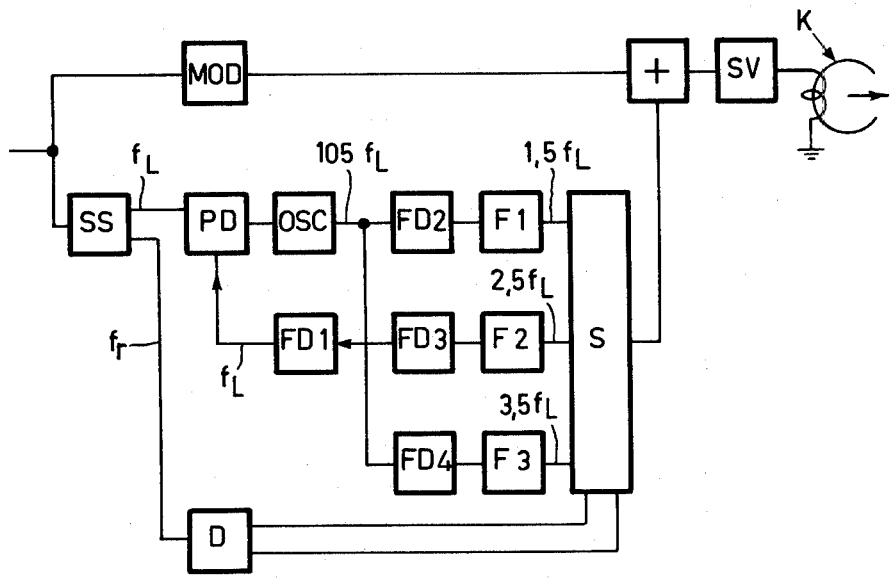

FIG. 8 shows a block diagram for the writing part of another measuring system which is suitable to write positioning signals in every information track of a recording medium. In this case also the measuring system forms part of a helical scan (or transversal scan) video recorder, and, in order to prevent cross-talk, the frequencies of the positioning signal in this case also are coupled to the line frequency of the video signal. In the present case the selected frequencies are 1.5 times, 2.5 times and 3.5 times the line frequency. The sync. separator SS separates the line synchronisation signal of frequency $f_L$ and the frame synchronisation signal of frequency $f_r$ from the complete video signal to be recorded. The frequency-controllable oscillator OSC generates a signal whose frequency is made exactly equal to 105 times the line frequency $f_L$ by means of a frequency divider FD 1 and a phase discriminator PD. The three required positioning frequencies are obtained by means of the frequency dividers FD 2, FD 3 and FD 4 connected to the output of the oscillator. By means of the filters $F_1$, $F_2$ and $F_3$ sinusoidal signals are made out of the block-shaped positioning signals which appear at the outputs of the frequency dividers. In a manner similar to FIG. 4 switching signals are derived from the frame synchronisation signal by means of the circuit D to control the electronic switch S which selects the positioning signals. These are applied to the input of the writing amplifier SV together with the complete video signal modulated by the frequency modulator MOD, the output of said amplifier being connected to the electric winding of the writing/reading head K.

Figure 9:
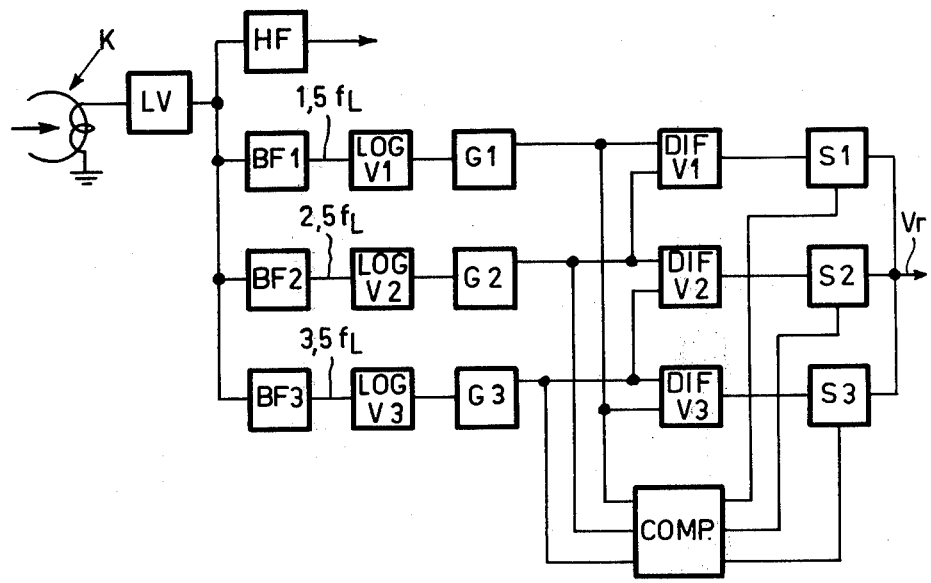
FIG. 9 is a block diagram of a circuit associated with the circuit shown in FIG. 8 with which the control voltage for controlling the head position is derived.

FIG. 9 shows a block diagram for the associated reading circuit. A reading amplifier LV amplifies the composite signal which is received from the writing/reading head K. The three positioning signals are separated from the signal by means of bandpass filters BF 1, BF 2 and BF 3. Amplification then takes place by means of logarithmic amplifiers log V 1, log V 2 and log V 3 and subsequent rectification by means of the rectifiers G 1, G 2 and G 3. The logarithmic amplifiers ensure that the dynamic of the signals applied to the rectifiers is decreased while as a result of this a substantially linear relationship is also obtained between the control voltage to be obtained and the deviation of the head from the centre of the two adjacent tracks. The rectified signals are subtracted from each other in the difference amplifiers DIF V 1, DIF V 2 and DIF V 3. The control voltage is then obtained from a correct choice of one of the three difference voltages. Said choice is made by means of the comparator COMP which determines the largest of the three positioning signals (that is the positioning signal of the selected track) and then controls that switch of the electronic switches S 1, S 2 and S 3 which is connected to the output of the difference amplifier of the two other positioning signals, so that the difference of two adjacent signals always provides the control signal $V_r$.

What is claimed is:

1. A servo system for controlling the position of a magnetic reading head relative to the center of a selected data track in a magnetizable layer of a recording medium that is relatively movable with respect to the reading head and is provided with a plurality of spaced tracks extending parallel to each other, said system comprising means for receiving short wave information signals and at least two ordered long-wave positioning signals, each of said long-wave positioning signals having a different frequency, means for recording said information signals in successive tracks and for successively superimposing each ordered position signal in separate ones of said data tracks in longitudinal alignment with said short-wave information signals in the magnetizable layer in which the data tracks are recorded, said positioning signals having a wavelength of a magnitude sufficient to produce crosstalk in a reading head placed over said selected data track, the wavelength of said short-wave information signals being of a magnitude insufficient to produce a crosstalk signal in said reading head placed over said selected data track, the spacing between tracks in which adjacent longwave positioning signals are recorded being at most equal to twice the spacing between the tracks in which the short-wave information signals are recorded, the adjacent recorded long-wave positioning signals having different frequencies, a magnetic reading head having a gap width substantially equal to the width of each track so as to scan the full width of a selected track and to simultaneously read all signals in said selected track and only the long-wave positioning signals in the tracks on either side thereof, said reading head producing during reading a composite signal, frequency sensitive electronic means for separating the two positioning signals read from the tracks on either side of the selected tracks from the composite signal, means for effecting a frequency comparison between the positioning signals and producing a servo signal which is a function of the deviation of the reading head from the center of the selected track and means responsive to the servo signal for adjusting the relative position between said reading head and said magnetic medium to align said reading head with said selected data track.

2. A servo system as claimed in claim 1 further comprising a helical scan video recorder, said magnetic reading read being mounted in said video recorder, said servo system being connected to said video recorder to keep said magnetic reading head centrally on a selected track, and wherein the frequencies of the positioning signals are coupled to the line frequency of the video signal.

3. A servo system as claimed in claim 2, wherein the frequencies of the positioning signals are an odd number of times half the line frequency.

4. A servo system as claimed in claim 2, characterized in that the frequencies of the positioning signals are an odd number of times half the line frequency of the video signal.

5. A servo system as claimed in claim 1, wherein the wavelength of the positioning signals is at least of the same magnitude as the distance between the tracks.

6. A servo system as claimed in claim 1, wherein the signal recording means receives positioning signals of a first, a second and a third wavelength, respectively for separately recording in every three successive tracks, the separating means comprising three frequency-selective filters for separating the positioning signals read from the selected track and from the two tracks on either side thereof from the composite signal and the comparison means comprising means for effecting an amplitude comparison of the three positioning signals.

7. A servo system as claimed in claim 1, in which the same magnetic head having a gap width which is substantially equal to the width of the tracks is included in both said signal recording means and said reading head.

8. A servo system as claimed in claim 1, wherein said electronic separating means connected to the output of the reading head comprises a frequency-selective filter for separating the positioning signals from the composite signal and a device for deriving a servo signal from the positioning signals.

9. In a servo system as recited in claim 1, wherein said long-wave positioning signals have two different frequencies, the long-wave positioning signals of each frequency being recorded in separate tracks, the track spacing between said recorded long-wave positioning signals being equal to twice the track spacing between the recorded short-wave information signals.

10. A servo system as claimed in claim 9, wherein said electronic separating means connected to the output of the reading head comprises two frequency-selective filters for separating the positioning signals of the tracks present beside a selected track from the composite signal, as well as an electronic circuit from which a servo signal is obtained by comparison of the amplitudes of the positioning signals.

11. A servo system for controlling the position of a magnetic recording head relatively to the center of a selected data track in a magnetizable layer of a recording medium that is relatively movable with respect to the reading head and is provided with a plurality of spaced tracks entending parallel to each other, said system comprising means for receiving shortwave information signals and two ordered long-wave positioning signals, each of said long-wave positioning signals having the same frequency and a different phase, means for recording said information signals in successive tracks and for successively superimposing each ordered positioning signals in separate ones of said data tracks in longitudinal alignment with said short-wave information signals in the magnetizable layer in which the data tracks are recorded, said positioning signals having a wavelength of a magnitude sufficient to produce crosstalk in a reading head placed over said selected data track, the wavelength of said short-wave information signals being of a magnitude insufficient to produce a crosstalk signal in said reading head placed over said selected data track, the spacing between tracks in which adjacent long-wave positioning signals are recorded being equal to twice the spacing between the tracks in which the short-wave information signals are written, the adjacent recorded long-wave positioning signals having different phases, a magnetic reading head having a gap width substantially equal to the width of each track so as to scan the full width of a selected track and to simultaneously read all signals in said selected tracks and only the long-wave positioning signals in the tracks on either side thereof, said reading head producing during reading a composite signal, frequency sensitive electronic means for separating the two positioning signals read from the tracks on either side of the selected track from the composite signal, means for effecting a phase comparison between said positioning signals and for producing a servo signal which is a function of the deviation of the reading head from the center of the selected track, and means responsive to the servo signal for adjusting the relative position between said reading head and said magnetic medium to align said reading head with said selected data track.

12. Apparatus as recited in claim 11, wherein the wavelength of the positioning signals is at least of the same magnitude as the distance between the tracks.

* * * * *

UNITED STATES PATENT AND TRADEMARK OFFICE
CERTIFICATE OF CORRECTION

PATENT NO. : 4,056,832
DATED : November 1, 1977
INVENTOR(S) : JACOB de BOER and ANTHONIE WALRAVEN It is certified that error appears in the above-identified patent and that said Letters Patent are hereby corrected as shown below:

Claim 2, line 3, "read" should be --head--;

Claim 11, line 6, "entending" should be --extending--;

Signed and Sealed this

Twenty-third Day of May 1978

[SEAL]

Attest:

RUTH C. MASON
Attesting Officer

LUTRELLE F. PARKER
Acting Commissioner of Patents and Trademarks